United States Patent [19]
Rydelek

[11] Patent Number: 5,400,098
[45] Date of Patent: Mar. 21, 1995

[54] SINGLE-USE CAMERA WITH COMBINED LENS HOLDER AND COVER FOR CASSETTE CHAMBER

[75] Inventor: James G. Rydelek, Rochester, N.Y.

[73] Assignee: Eastman Kodak Company, Rochester, N.Y.

[21] Appl. No.: 199,417

[22] Filed: Feb. 23, 1994

[51] Int. Cl.[6] .............................................. G03B 17/02
[52] U.S. Cl. ..................................... 354/288; 354/286
[58] Field of Search ................. 354/288, 286, 293, 82, 354/219, 223

[56] References Cited

U.S. PATENT DOCUMENTS

| | | | |
|---|---|---|---|
| 3,961,349 | 6/1976 | Forsyth et al. | 354/286 |
| 4,967,214 | 10/1990 | Taniguchi et al. | 354/286 |
| 5,255,041 | 10/1993 | Lyon et al. | 354/288 |
| 5,313,240 | 5/1994 | Lyon et al. | 354/288 |

FOREIGN PATENT DOCUMENTS

0527430A1  2/1993  European Pat. Off. ..... G03B 19/04

*Primary Examiner*—Monroe H. Hayes
*Attorney, Agent, or Firm*—Roger A. Fields

[57] ABSTRACT

A single-use camera has a main body with a lens opening for a taking lens and a cassette chamber which contains a film cassette. According to the invention, a front cover light-tightly seals the cassette chamber and has a lens holder for holding the taking lens in place relative to the lens opening, but can be separated from the main body to access the taking lens and to open the cassette chamber for removing the film cassette from the cassette chamber.

3 Claims, 2 Drawing Sheets

SINGLE-USE CAMERA WITH COMBINED LENS HOLDER AND COVER FOR CASSETTE CHAMBER

FIELD OF THE INVENTION

The invention relates generally to the field of photography, and in particular to single-use cameras. More specifically, the invention relates to a single-use camera with a combined lens holder and cover for a cassette chamber.

BACKGROUND OF THE INVENTION

Film and cameras that are all in one, commonly referred to as single-use or disposable cameras, have recently become well known. Typically, the single-use camera is a simple point-and-shoot type which comprises a plastic light-tight housing with a fixed-focus taking lens, a film metering mechanism, a single blade shutter, a frame (exposure) counter, possibly a built-in electronic flash unit, and a decorative cardboard casing containing the light-tight housing and having respective openings for the taking lens, a shutter release button, a film advance thumbwheel, a direct see-through viewfinder, the frame counter, and a flash emission window. At the manufacturer, the light-tight housing is loaded with a 12, 24, or 36 exposure 35 mm film cassette and substantially the entire length of the unexposed filmstrip is factory prewound from the cassette onto a spool in the housing or simply into a roll. Then, after the photographer takes a picture, he or she manually rotates the thumbwheel to rewind the exposed frame into the cassette. The rewinding movement of the filmstrip the equivalent of slightly more than one frame width rotates a metering sprocket to decrement the frame counter to its next lower-numbered setting. Further details of this operation are disclosed in commonly assigned U.S. Pat. No. 5,235,366, issued Aug. 10, 1993, and in U.S. Pat. 4,890,130, issued Dec. 26, 1989. When the maximum number of exposures available on the filmstrip are exposed and the filmstrip is completely rewound into the cassette, the camera is given to a photofinisher who first removes the cassette with the filmstrip from the housing to develop the negatives and then forwards the camera to the manufacturer for recycling. The manufacturer, in turn, recycles the camera by loading it with another roll of film and repeating the foregoing prewinding process.

Prior art Eur. Pat. Applic. 0 527 430 A1, published Feb. 17, 1993, discloses a single-use camera comprising a main body with a lens opening for a taking lens and a cassette chamber for a film cassette. The taking lens is attached to the main body and is located over the lens opening. A rear cover is attached to the main body to light-tightly seal the cassette chamber. A front cover is attached to the main body and a lens hood of the front cover is located around the taking lens. An exterior cardboard casing extends over the front and rear covers and the exposed top and bottom of the main body. To unload the film cassette from the cassette chamber to develop the negatives, the exterior casing is first torn away from the rear cover, and the rear cover is then separated from the main body to open the cassette chamber. When recycling the camera, it is preferable to replace the taking lens or at least remove it from the main body for cleaning. Therefore, the front cover must be separated from the main body.

Prior art U.S. Pat. No. 5,255,041, issued Oct. 19, 1993, discloses a single-use camera comprising an exterior decorative cardboard casing having an open end, and a light-tight housing arranged partly inside the exterior casing and having an end portion with a cassette chamber located outside the exterior casing. The end portion of the housing includes an integral door supported for opening movement to uncover the cassette chamber without being obstructed by the exterior casing. As a result, a film cassette can be removed from the cassette chamber to develop the negatives without having to first tear the exterior casing away from the housing as in Eur. Pat. Applic. 0 527 430 A1. However, the taking lens cannot be removed from the housing for replacement or at least cleaning during recycling.

PROBLEMS TO BE SOLVED BY THE INVENTION

Prior art Eur. Pat. Applic. 0 527 430 A1 and U.S. Pat. No. 5,255,041 fail to suggest a simple efficient way to remove the film cassette from the camera and to permit the taking lens to be replaced or at least cleaned. Moreover, they fail to suggest how this can be done without having to first tear the exterior casing away from the camera.

SUMMARY OF THE INVENTION

According to the invention, a single-use camera comprising a main body with a lens opening for a taking lens and a cassette chamber which contains a film cassette, is characterized in that:
a front cover light-tightly seals the cassette chamber and has a lens holder for holding the taking lens in place relative to the lens opening, but can be separated from the main body to access the taking lens and to open the cassette chamber for removing the film cassette from the cassette chamber.

Preferably, the camera includes an exterior decorative casing that extends over the main body and not over the front cover to permit the front cover and its lens holder to be separated from the main body without removing the exterior casing from the main body.

ADVANTAGEOUS EFFECTS OF THE INVENTION

The invention provides a simple efficient way to remove the film cassette from the camera and to permit the taking lens to be replaced or at least cleaned. Moreover, it suggests how this can be done without having to first tear the exterior casing away from the camera.

DETAILED DESCRIPTION OF THE INVENTION

The invention is disclosed as being embodied preferably in a single-use or disposable camera. Because the features of a single-use camera are generally known, the description which follows is directed in particular only to those elements forming part of or cooperating directly with the disclosed embodiment. It is to be understood, however, that other elements may take various forms known to a person of ordinary skill in the art.

Figure 1:
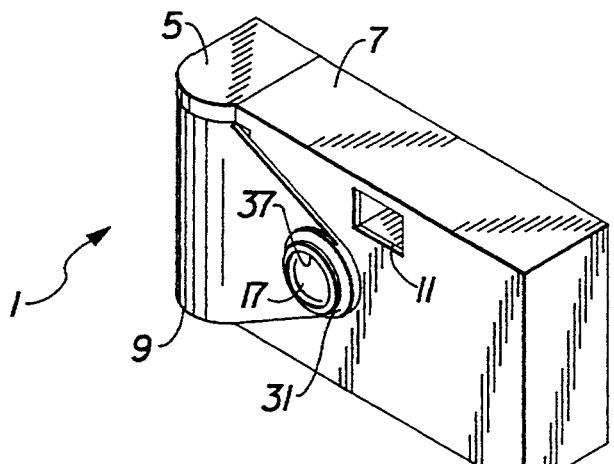
FIG. 1 is a perspective view of a single-use camera according to a preferred embodiment of the invention, showing the single-use camera in a fully assembled state.
Figure 2:
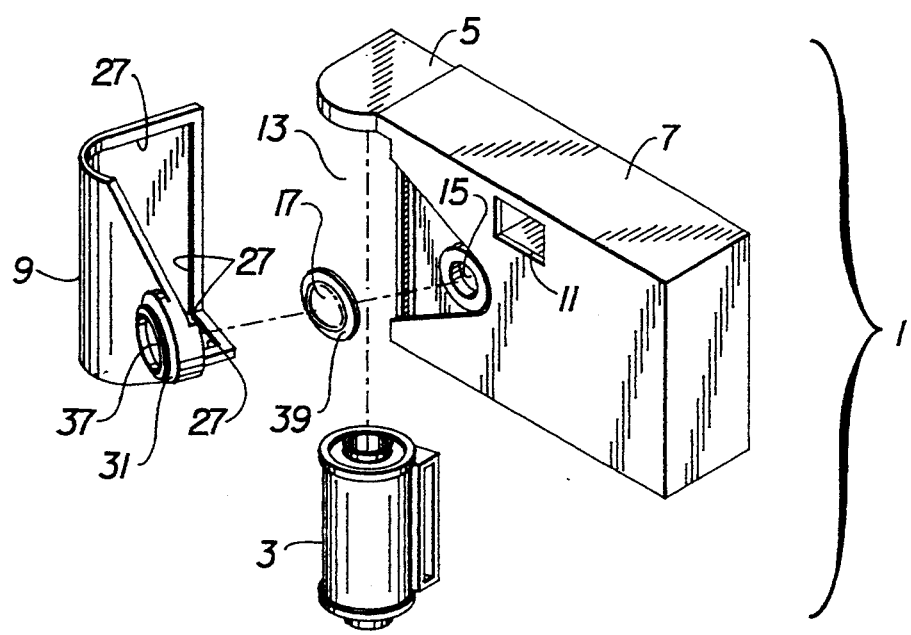
FIG. 2 is a perspective view similar to FIG. 1, showing the single-use camera with a combined lens holder and cover for a cassette chamber removed from a main body.
Figure 3:
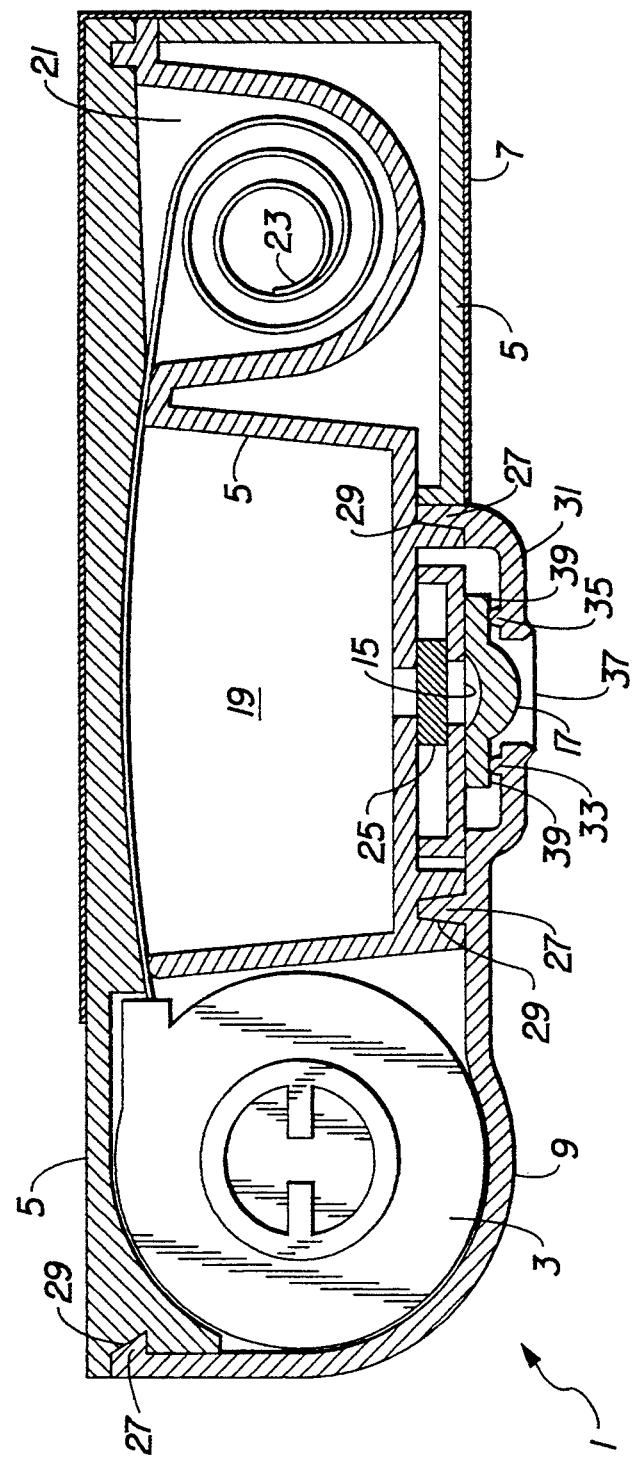
FIG. 3 is a sectional view of the single-use camera.

Referring now to the drawings, FIGS. 1-3 show a simple point-and shoot single-use camera 1 comprising a conventional 35 mm film cassette 3, a plastic main body 5, an exterior decorative cardboard casing 7, and a plastic front cover 9.

The main body 5 includes a direct see-through viewfinder 11 for viewing a subject to be photographed, a cassette chamber 13 for the film cassette 3 which opens to the front, bottom, and one end of the main body, a baffle lens opening 15 for a fixed focus taking lens 17, an exposure chamber 19 located behind the lens opening, and a film roll chamber 21 for an unexposed film roll 23 having a trailing film end attached to a film spool (not shown) rotatably supported inside the film cassette. A single-blade shutter 25 is located between the lens opening 15 and the exposure chamber 19.

The front cover 9 has a peripheral lip 27 that is adapted to mate with a corresponding groove 29 in the main body 5 to light-tightly seal the cassette chamber 13 in a known manner, and it has a lens holder 31 for holding the taking lens 17 in place relative to the baffle lens opening 15. In particular, the lens holder 31 has three projections or studs 33 and 35 (only two shown) which surround a central opening 37 in the lens holder and press against a flanged periphery 39 of the taking lens 17 to hold the taking lens beneath the central opening and over the baffle lens opening 15 as shown in FIG. 3.

The exterior casing 7 extends over the main body 5. However, the exterior casing 7 does not extend over the front cover 9 in order to permit the front cover and its lens holder 31 to be separated from the main body 5 without having to remove the exterior casing from the main body. This can be seen in FIG. 2. When the front cover 9 is separated from the main body 5, the film cassette 3 can be removed from the cassette chamber 13 and the taking lens 17 can be cleaned or replaced.

The invention has been described with reference to a preferred embodiment. However, it will be appreciated that variations and modifications can be effected by a person of ordinary skill in the art without departing from the scope of the invention. For example, the taking lens 17 can be secured to the lens holder 31 by glue or other adhering means.

PARTS LIST FOR FIGS, 1-3

1. camera
3. film cassette
5. main body
7. exterior casing
9. front cover
11. viewfinder
13. cassette chamber
15. baffle lens opening
17. taking lens
19. exposure chamber
21. film roll chamber
23. unexposed film roll
25. shutter
27. peripheral lip of front cover 9
29. corresponding groove in main body 5
31. lens holder
33. projection
35. projection
37. central opening in lens holder 31
39. flanged periphery of taking lens 17

What is claimed is:

1. A single-use camera comprising a main body with a lens opening for a taking lens and a cassette chamber which contains a film cassette, is characterized in that:

a front cover light-tightly seals said cassette chamber and has a lens holder for holding said taking lens in place relative to said lens opening, but can be separated from said main body to access said taking lens and to open said cassette chamber for removing said film cassette from the cassette chamber.

2. A single-use camera as recited in claim 1, wherein said taking lens is secured to said lens holder to be separated from said main body when said front cover is separated from the main body.

3. A single-use camera as recited in claim 1, wherein an exterior decorative casing extends over said main body and not over said front cover to permit the front cover and its lens holder to be separated from the main body without removing said exterior casing from the main body.

* * * * *